United States Patent
Smock

[19]

[11] Patent Number: 5,961,135
[45] Date of Patent: Oct. 5, 1999

[54] GO-CART FRAME AND WHEEL SUSPENSION

[76] Inventor: Daniel D. Smock, 2320 E. Commerce Rd., Milford, Mich. 48381

[21] Appl. No.: 08/951,046

[22] Filed: Oct. 15, 1997

[51] Int. Cl.$^6$ ................................................ B62D 61/08
[52] U.S. Cl. ................................ 280/124.11; 180/227
[58] Field of Search .......................... 180/291, 227; 280/124.11, 124.1, 124.109, 124.116

[56] References Cited

U.S. PATENT DOCUMENTS 2,910,130  10/1959  Schlaphoff ........................... 180/227
5,343,974  9/1994  Rabek ............................ 280/124.116

FOREIGN PATENT DOCUMENTS 2634720  2/1990  France ................................. 180/227

*Primary Examiner*—Christopher P. Ellis
*Attorney, Agent, or Firm*—Charles W. Chandler

[57] ABSTRACT

A go-cart has a continuous annular frame formed of rectangular cross-section tubing for increased strength and bending resistance. The front suspension includes a pair of trailing arms that support the front wheels such that they are always in an upright position. The rear wheel axle is supported on the rear end of a swinging arm suspension.

6 Claims, 4 Drawing Sheets

GO-CART FRAME AND WHEEL SUSPENSION

BACKGROUND AND SUMMARY OF THE INVENTION

This invention relates to go-carts, especially four wheel go-carts driven by small gasoline engines in the range of eight to fifteen horsepower. Such go-arts commonly are provided in two or more different sizes to accommodate a child or adult driver (or two persons side-by-side).

Conventional go-carts have a relatively stiff and uncomfortable suspension. The broad purpose of the present invention is to provide an improved go-cart having a high strength frame with improved front and rear suspensions.

The go-cart has an elongated main frame with a front end and a rear end. A pair of front wheels are mounted on the front end and a pair of rear wheels are mounted on the rear end, each by their respective suspension means.

The front end suspension comprises a pair of generally horizontal trailing arms mounted on opposite sides of the main frame. The rear end of each trailing arm is pivotally connected to the main frame so that both trailing arms pivot about a common axis that is transverse to the longitudinal axis of the main frame. This permits the forward end of each trailing arm to independently swing in an up and down motion vertical motion.

A linkage mechanism connects the front end of each trailing arm to the main frame. A t-shaped shock tower structure is attached to the forward end of the main frame. A pair of generally horizontal parallel trailing arm rods are connected between the shock tower and each of the front trailing arms. Each pair of trailing arm rods includes an upper rod having an inner end connected by a ball joint to the shock tower and a lower rod connected by a ball joint to the shock tower. The ball joints on the inner ends of the two trailing arm rods are aligned along a generally vertical axis.

The two trailing arm rods have equal lengths and are connected by ball joints to the forward end of their respective trailing arm. The vertical distance between the ball joints connected to the trailing arm is identical to the vertical distance between the ball joints of the inner ends of the rods. This arrangement permits the forward end of each trailing arm to swing up and down constrained by the two parallel trailing arm rods so that the trailing arm moves parallel to the axis of the shock tower.

A wheel is mounted by a clevis and pin means to the forward end of each trailing arm so that the wheel always moves in an up and down motion with respect to the main frame parallel to the shock tower. A pair of shock absorbers connect the upper end of the shock tower to the outer ends of the trailing arms to dampen the up and down motion of the front wheels.

The rear wheels are carried on an axle supported by a pair of swinging arms. The swinging arms are connected to the main frame to pivot about an axis that extends transverse to the longitudinal axis of the main frame.

The main frame supports a gasoline engine which drives a drive sprocket about the same axis as the pivot axis of the swinging arms. A driven sprocket is carried on the rear wheel axle. The two sprockets are connected by a chain in such a manner that as the rear wheels move up and down, the chain moves around the two sprockets with a constant tension. This improves the life of the chain and reduces any tendency of the chain to stretch through use.

The entire frame is formed of a rectangular tubing which provides a much stronger frame structure than conventional go-cart frames.

Specific features of the invention will be apparent from the attached drawings and description of an illustrative embodiment of the invention.

BRIEF DESCRIPTION OF THE DRAWINGS

The description refers to the accompanying drawings in which like reference characters refer to like reference parts throughout the several views, and in which:

FIG. 7 is taken in the direction of arrow 7 in FIG. 2;

FIG. 8 is taken in the direction of arrow 8 in FIG. 2.

DESCRIPTION OF A PREFERRED EMBODIMENT OF THE INVENTION

Figure 1:
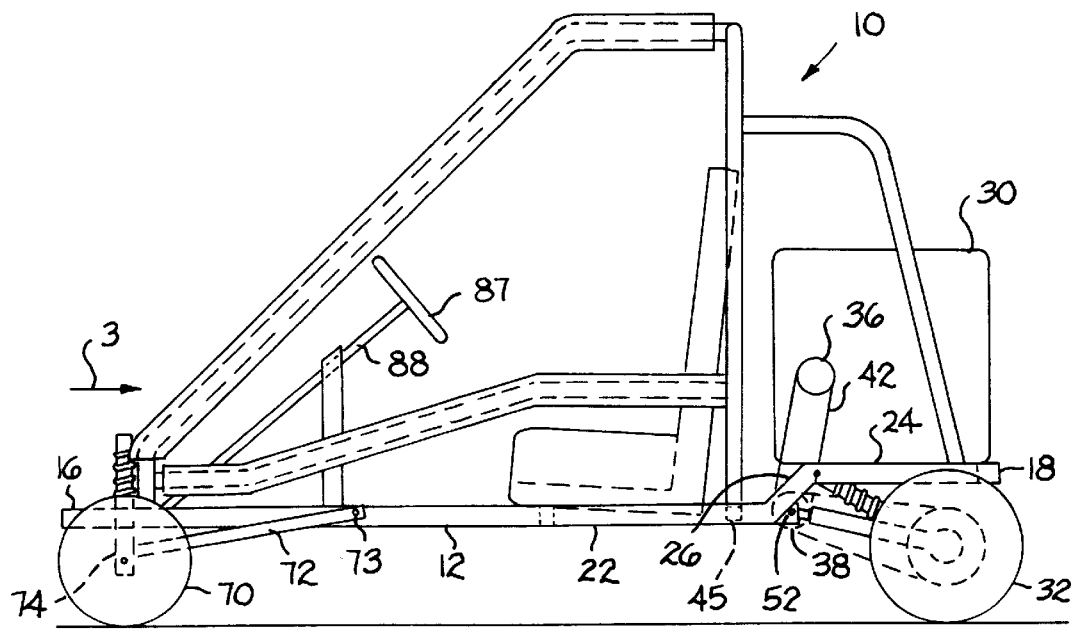
FIG. 1 is a side elevational view of a go-cart constructed according to the invention.
Figure 2:
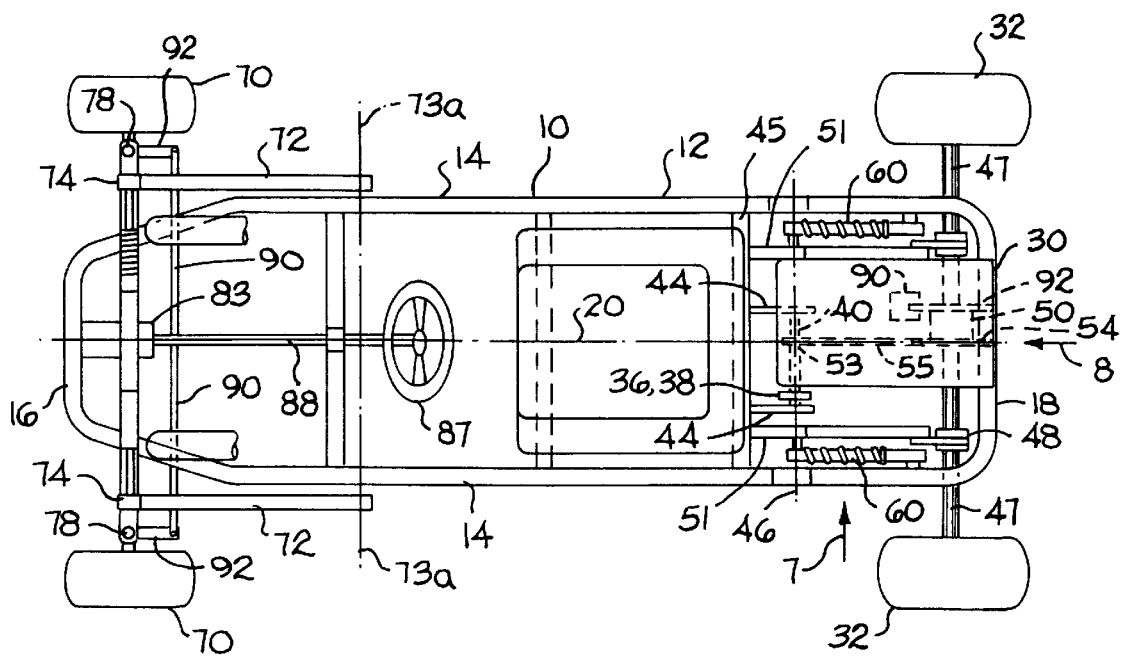
FIG. 2 is a top plan view of the FIG. 1 go-cart.

FIGS. 1 and 2, show a go-cart 10 having a generally planar main frame 12 formed of rectangular cross-sectional steel tubing. As shown in FIG. 2, the main frame includes two longitudinally extending side rails 14, a front nose element 16, and a rear transverse frame element 18. The frame is symmetrical around a longitudinal axis 20. Corner areas of the frame are preferably formed out of single curved tube elements for strength purposes. Suitable padded roll bars and attachment bars may be provided for driver protection purposes. The roll bars are shown in FIG. 1, but are omitted from FIG. 2 in order to illustrate other features of greater interest to the present invention.

As viewed in FIG. 1, main frame 12 comprises a forward frame section 22, a rearward frame section 24, and an inclined transition section 26 connecting frame section 22 to frame section 24. The rearward frame section is elevated a few inches above frame section 22 to provide increased ground clearance for the rear wheel suspension mechanism. The forward section of the frame is relatively close to the ground, in order to bring the driver of the vehicle into proximity to the ground, to achieve a low center of gravity.

A conventional internal combustion engine 30 is mounted on rearward frame section 24 for powering a pair of laterally spaced rear wheels 32. An upper drive sprocket 36 on the engine is connected to a lower drive sprocket 38 mounted on a transverse jack shaft 40 located in the area below the engine. A chain 42 transmits the drive force from sprocket 36 to sprocket 38. Jack shaft 40 is supported on jack shaft bearings carried by arms 44 that extend rearwardly from a cross piece 45 on main frame 12. Jack shaft 40 rotates about an axis 46 disposed transversely to the longitudinal axis of the main frame.

Axle means 47 extend between the two rear wheels. The rear wheel suspension mean, includes bearings 48 mounted on the rear ends of a pair of swinging arms 49. Arms 49 support axle means 47 for rotary motion. An intermediate bearing 49a mounted on arm 49b provides additional axle support between differential 50 and the left bearing 48 as viewed in FIG. 8. Axle means 47 comprises two aligned shafts interconnected by a differential 50, whereby the two rear wheels can rotate at different speeds when the vehicle is turning to the right or to the left.

The forward end of each swinging arm 49 is swingably connected to a tubular support 51 extending rearwardly from cross piece 45. As an important feature of the invention, pivot axis 52 for each swinging arm 49 coincides with axis 46 of the jack shaft, such that the swinging arms can swing around axis 52 without interfering with the driving connection between the engine and axle means 47.

The driving connection between the engine and axle means 47 comprises a drive sprocket 53 carried on jack shaft 40 and a larger driven sprocket 54 carried on axle means 47. A drive chain 55 extends around sprockets 53 and 54 to rotate the axle means. The arrangement is such that as the wheels move up and down with respect to the main frame, driven sprocket 54 swings in an arc about the axis of rotation of drive sprocket 53. Drive chain 55 thereby always remains in a non-varying state of tension. This prolongs the chain life and reduces the maintenance of adjusting.

To summarize the drive system for rear axle means 47: sprocket 36 on the engine rotates jack shaft 40 via drive chain 42 and sprocket 38. The jack shaft transmits the drive force to axle means 47 via sprocket 53, chain 55, and sprocket 54. The diameter of sprocket 54 is appreciably greater than the diameter of sprocket 53 in order to achieve a desired speed reduction from shaft 40 to axle means 47.

Bearings 48 are preferably adjustably supported on vertical chain adjustment plates 56 at the rear ends of swinging arms 49, whereby minor adjustments can be made in the bearing locations to compensate for manufacturing tolerances in frame construction and swinging arm construction. Bearing adjustability ensures that axle means 47 has a precise transverse orientation to the main frame longitudinal axis 20, and adjusts the chain tension.

Figure 7:
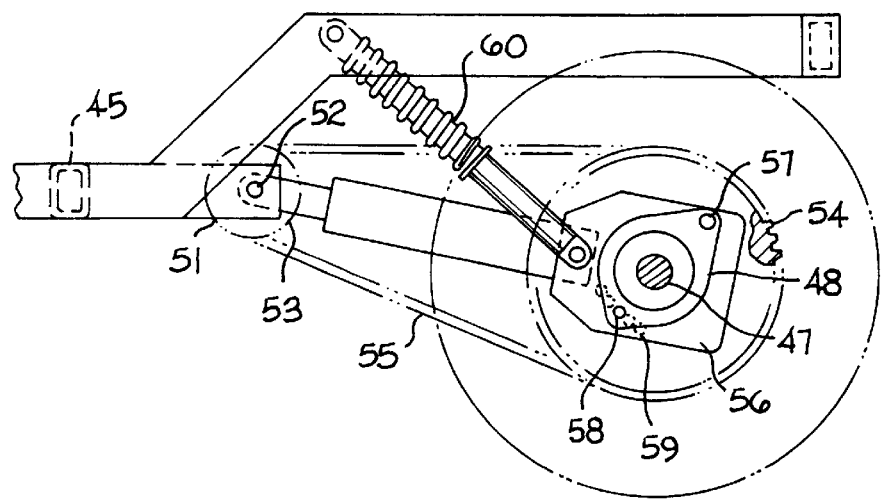
FIG. 7 is a fragmentary enlarged side view of a rear swing arm suspension used in the FIG. 1 vehicle.
Figure 9:
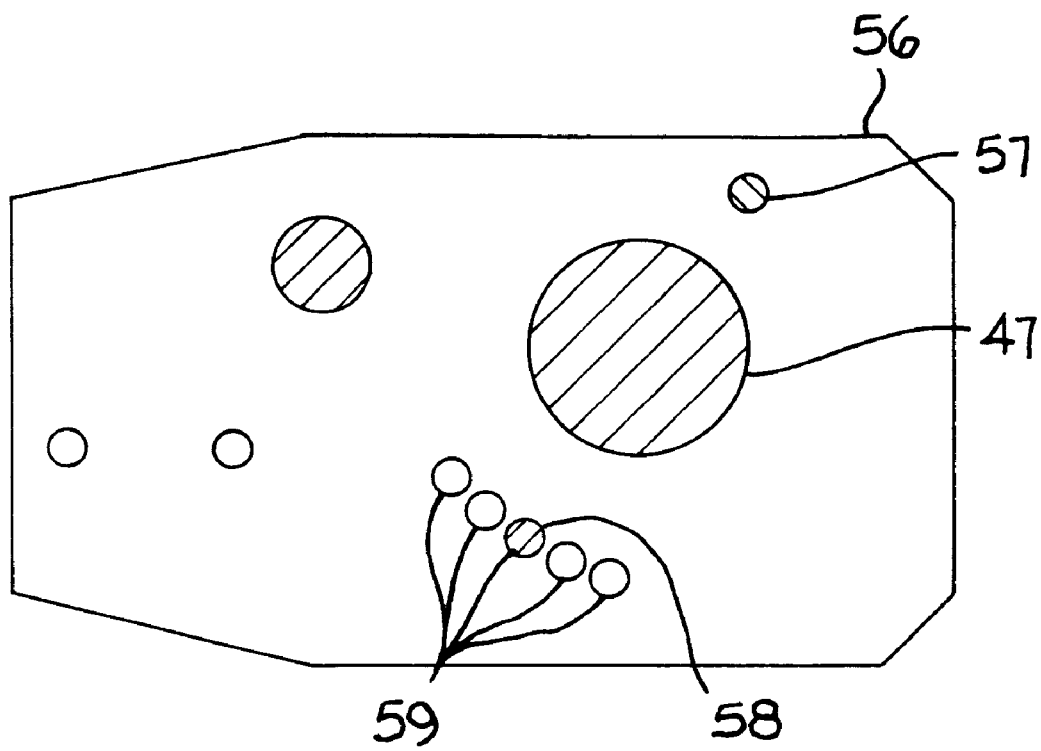
FIG. 9 is an elongated view if the chain adjustment plate.

Referring to FIGS. 7 and 9, each bearing 48 has a pivot mount 57 on plate 56 and a bolt connection 58 selectively extendible through any one of five or six bolt holes 59 located in plate 56 along an arc taken around pivot mount 57. The bearing can be adjusted by selecting an appropriate bolt hole 59 for the connector bolt.

The rear wheel suspension further comprises two resilient elongated shock-absorbing struts 60 trained between main frame 12 and rear swinging arms 49. The upper end of each strut 60 is pivotally connected to main frame 12; the lower end of each strut is pivotally connected to plate 56 of the swinging arm a slight distance in front of bearing 48.

Figure 4:
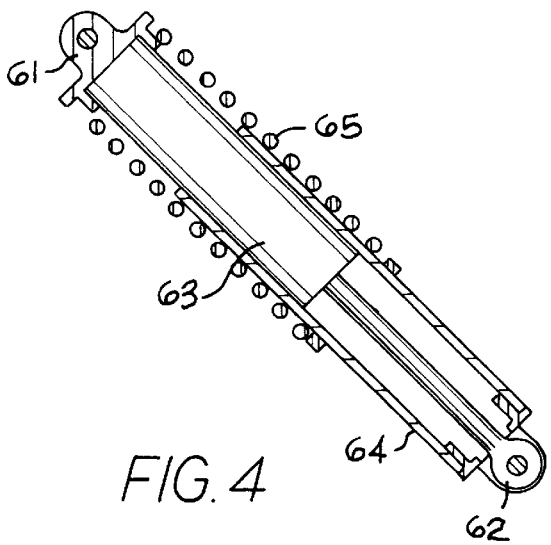
FIG. 4 is a sectional view taken through a shock-absorbing strut employed in the FIG. 1 go-cart.

Each shock-absorbing strut may be constructed as shown in FIG. 4. The strut construction includes an upper end fitting 61, a lower end fitting 62, and a conventional hydraulic shock absorber 63 extending between the end fittings. The strut includes a sleeve 64 extending from end fitting 62 in slideable telescopic relation to the shock absorber, and a compression spring 65 extending between end fitting 61 and an abutment collar on sleeve 64.

Compression spring 65 provides a resilient suspension support. Hydraulic shock absorber 63 dampens the wheel motion to reduce oscillatory motions.

Referring to FIG. 7, the rearward section of main frame 12 is elevated an appreciable distance from the ground surface to permit considerable travel of the wheel suspension. Rear wheels 32 are located outside the frame (as shown in FIG. 2) so as to be capable of unobstructed travel around the swinging arm pivot axis 52. Drive chain 55 remains operative in any position of the swinging arms.

Referring to FIGS. 1 and 2, a pair of laterally spaced wheels 70 are connected to main frame 12 by a front suspension that includes two laterally-spaced trailing arms 72 having pivot connections 73 to the main frame such that both trailing arms 72 can swing about a common axis 73a. Axis 73a is transverse to the longitudinal axis 20 of the main-frame. The forward end of each trailing arm 72 is welded to an upstanding tubular support 74 having a channel 76 affixed to its side surface. A pivot member 78 within the channel carries a stub axle for the associated front wheel, whereby the wheel can turn around pivot axis 79 for turning (maneuvering) purposes. Each wheel pivots up and down with its associated trailing arm.

A second channel 80 is affixed to a side surface of support 74 for pivotably mounting the outer ends of upper and lower parallel trailing arm rods 81. Each trailing arm rod has its inner end pivotably attached to an upright shock tower 83 welded at the front end of main frame 12 on the frame longitudinal axis 20, by conventional ball shaped bushing means 83a. Bushing means 83a permit trailing arm rods 81 to swing in at least 2 degrees of freedom with respect to the attaching joints.

All four trailing arm rods 81 have the same effective length. The inner ends of each pair of parallel upper and lower rods are pivotally connected to the shock tower along a pair of horizontally spaced parallel joint axes 73b that are perpendicular to the plane of the main frame.

The outer ends of the four trailing arm rods are pivotally connected by bushing means 83a to a pair of clevis 76 along a pair of joint axes 73c that are parallel to axes 73b.

Thus the four wheels 70 move up and down with their respective trailing arms in planes that are parallel to axes 73b and axes 73c, even when the go-cart is moving through a turning motion.

Still referring to FIG. 1, a cross piece 84 at the upper end of shock tower 83 provides connection points for the upper ends of two resilient shock-absorbing struts 85. Each strut may be constructed as shown in FIG. 4. Typically the front struts 85 are identical to rear struts 60. The lower end of each strut 85 is pivotably attached to one of the supports 74; a single pivot pin can be extended through channel 80 to pivotably support the outer end of the upper trailing arm rod 81 and the lower end of strut 85.

Figure 3:
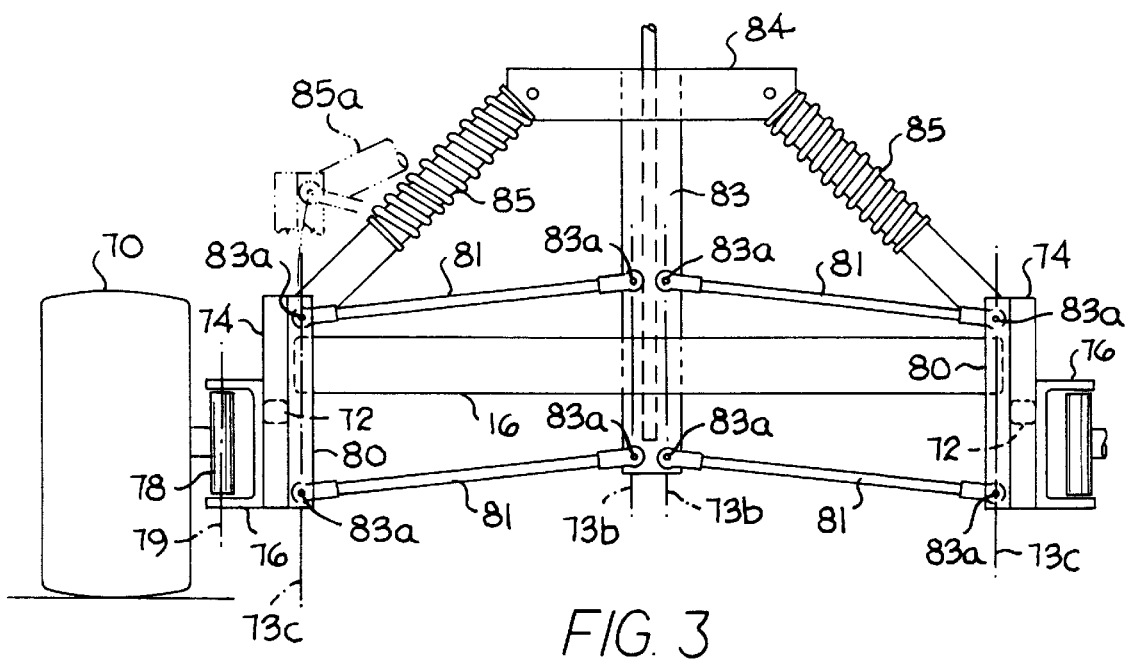
FIG. 3 is an enlarged front view of the FIG. 1 go-cart taken in the direction of arrow 3 in FIG. 1.
Figure 5:
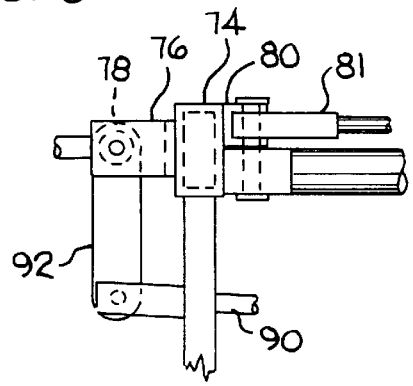
FIG. 5 is a fragmentary plan view of the trailing arms steering knuckle-frame connection used in the FIG. 1 vehicle.

As viewed in FIG. 3, the two shock-absorbing struts 85 are arranged in an inverted "V" configuration symmetrical with the frame longitudinal centerline. However, the struts act independently, such that the right and left wheels can move independently in the jounce and rebound directions.

Figure 6:
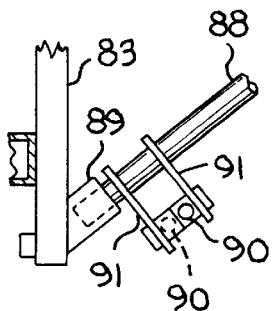
FIG. 6 is a fragmentary side elevational view of a steering column used in the FIG. 1 vehicle.

Front wheels 70 are non-powered steerable wheels. Steering is accomplished by a manual steering wheel 87 affixed to the upper end of rotary steering column 88. The lower end of column 88 is rotatable in a steering knuckle 89 (FIG. 6) secured to and mounted behind shock tower 83. Right and left tie rods 90 extend in opposite directions from arms 91 on the steering column to arms 92 attached to pivot members 78. The steering system operates so that manual turning of wheel 87 turns pivot members 78, to thereby adjust the rotational planes of the associated road wheels 70.

As shown in FIG. 7, each rear strut 60 is angled at about forty five degrees to an imaginary horizontal plane passing through the rotational axes of rear wheels 32. As shown in FIG. 3, each front strut 85 is angled at about forty five degree to an imaginary horizontal plane passing through the rotational axes of front wheels 70.

The acute angulations of struts 60 and 85 is advantageous in that contraction and expansion of the struts during the jounce and rebound periods are greater than the corresponding wheel travel (measured in the vertical direction). The shock absorber struts can have a relatively long travel for a softer ride.

As the shock absorber strut nears the upper limit of road wheel travel (depicted in dashed lines 85*a* in FIG. 3), the angulation decreases to about twenty five degrees, so as to further lengthen the stroke. The lengthened stroke enables a relatively great percentage of the road wheel travel to be used for snubbing (i.e. decelerating smoothly). A relatively long wheel travel and smooth wheel deceleration at the upper limit of travel are achieved.

Figure 8:
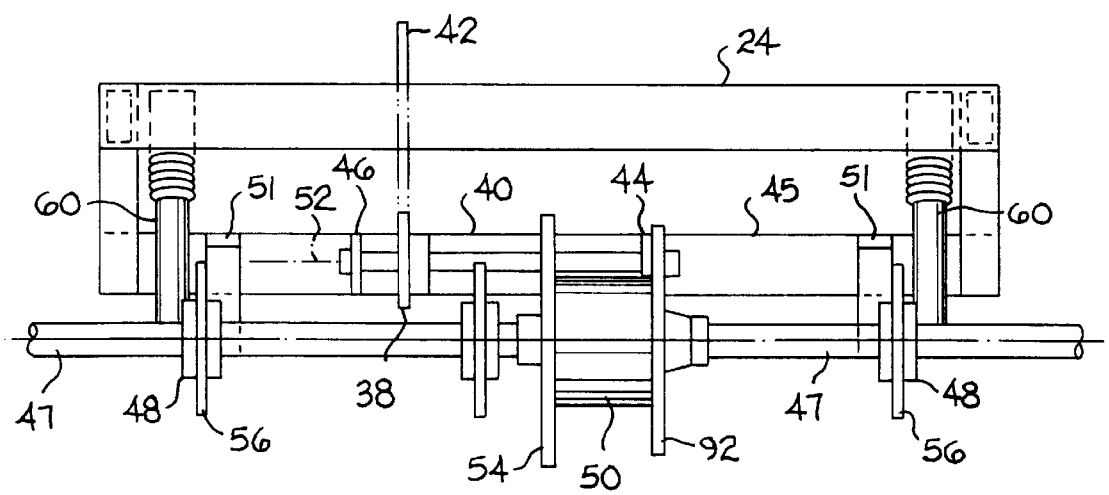
FIG. 8 is a fragmentary enlarged rear view of the suspension shown in FIG. 7.

Referring to FIGS. 2 and 8, a disk braking device 90 is mounted adjacent the rear axle. A braking disk 92 is bolted to the differential housing so the driver can brake both of the rear wheel axles as a unit.

Go-carts are very often driven over rough terrain. The disclosed wheel suspensions depicted herein provide a comfortable ride, which is desirable in rough terrain operation. Smooth wheel deceleration also reduces stress on the frame, thereby prolonging the useful life of the vehicle.

Having described my invention, I claim:

1. A four wheel go-cart, comprising:

a main frame having a forward end, a rear end and a longitudinal axis;

power means mounted on the main frame;

a pair of laterally spaced front wheels mounted on the forward end of the main frame;

a pair of laterally spaced rear wheels, and a rear wheel suspension means including:

a pair of spaced parallel swing arms;

means supporting the swing arms to the main frame for pivotal motion about a rear suspension axis generally transverse to the longitudinal axis of the main frame;

rear axle means supported on said swing arms, the rear wheels being connected to the rear axle means for rotation about a rear wheel axis that is parallel to the rear suspension axis, whereby the rear wheels can swing in a vertical motion about said rear suspension axis;

a drive sprocket rotatably carried on the main frame for rotation about the rear suspension axis, and means connecting the power means to the drive sprocket for powered rotation;

a driven sprocket carried on the rear axle means for rotation about the rear wheel axis, and a drive chain carried around the drive sprocket and the driven sprocket whereby the rear wheels can move up and down with respect to the main frame as the drive chain remains in a generally constant state of tension as the drive sprocket drives the driven sprocket;

said rear axle means comprising a pair of aligned axles and a differential means connecting said aligned axles;

said differential means comprising a differential housing having first and second oppositely facing ends;

said driven sprocket being mounted on one end of said differential housing;

braking means for said rear axle means; and said braking means comprising a braking disc mounted on the other end of said differential housing.

2. A go-cart as defined in claim 1, and further comprising means for adjusting the tension in said driven chain; said tension adjusting means comprising a chain adjustment plate (56) carried on each swing arm remote from the swing arm support means, an axle bearing for each axle supported on each chain adjustment plate, and means for adjusting each bearing on the associated chain adjustment plate so that said driven sprocket can be adjusted toward or away from said drive sprocket.

3. A go-cart as defined in claim 2, wherein each said axle bearing has a pivotal connection (57) and a bolt connection (58) with the associated chain adjustment plate; said bolt connection comprising an array of bolt holes (59) extending through the associated plate along an arc taken around said pivotal connection.

4. A go-cart as defined in claim 1, wherein each swing arm has a swing plane that is approximately equidistant from the differential housing and an associated rear wheel.

5. A four wheel go-cart, comprising:

a main frame having a forward end, a rear end and a longitudinal axis;

power means mounted on the main frame;

a pair of laterally spaced front wheels mounted on the forward end of the main frame;

a pair of laterally spaced rear wheels, and a rear wheel suspension means including:

a pair of spaced parallel swing arms;

means supporting the swing arms to the main frame for pivotal motion about a rear suspension axis generally transverse to the longitudinal axis of the main frame;

rear axle means supported on said swing arms, the rear wheels being connected to the rear axle means for rotation about a rear wheel axis that is parallel to the rear suspension axis, whereby the rear wheels can swing in a vertical motion about said rear suspension axis;

a drive sprocket rotatably carried on the main frame for rotation about the rear suspension axis, and means connecting the power means to the drive sprocket for powered rotation; and a driven sprocket carried on the rear axle means for rotation about the rear wheel axis, and a drive chain carried around the drive sprocket and the driven sprocket whereby the rear wheels can move up and down with respect to the main frame as the drive chain remains in a generally constant state of tension as the drive sprocket drives the driven sprocket; and means for adjusting the tension in said drive chain; said tension adjusting means comprising a chain adjustment plate (56) carried on each swing arm remote from the swing arm support means, an axle bearing for said axle means supported on each said chain adjustment plate, and means for adjusting each bearing on the associated chain adjustment plate so that said driven sprocket can be adjusted toward or away from said drive sprocket.

6. A go-cart as defined in claim 5, wherein each said axle bearing has a pivotal connection (57) and a bolt connection (58) with the associated chain adjustment plate; said bolt connection comprising an array of bolt holes (59) extending through the associated plate along an arc taken around said pivotal connection.

* * * * *